(12) United States Patent
Feltham et al.

(10) Patent No.: US 9,514,298 B2
(45) Date of Patent: Dec. 6, 2016

(54) PASSCODE DETERMINATION OR VERIFICATION

(71) Applicant: International Business Machines Corporation, Armonk, NY (US)

(72) Inventors: Andrew S. Feltham, Hampshire (GB); Dominic P. Harries, Winchester (GB); Graham White, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 14/509,541

(22) Filed: Oct. 8, 2014

(65) Prior Publication Data

US 2015/0169861 A1 Jun. 18, 2015

(30) Foreign Application Priority Data

Dec. 17, 2013 (GB) .................................. 1322265.8

(51) Int. Cl.
| | | |
|---|---|---|
| G06F 21/00 | (2013.01) | |
| G06F 21/36 | (2013.01) | |
| G06F 7/04 | (2006.01) | |
| G06F 12/00 | (2006.01) | |
| G06F 12/14 | (2006.01) | |
| G06F 13/00 | (2006.01) | |
| G06F 17/30 | (2006.01) | |

(52) U.S. Cl.
CPC ..................................... G06F 21/36 (2013.01)

(58) Field of Classification Search
None
See application file for complete search history.

(56) References Cited

U.S. PATENT DOCUMENTS

| | | | | |
|---|---|---|---|---|
| 7,562,227 B1* | 7/2009 | Cox | ......................... | G06F 21/36 713/183 |
| 9,117,068 B1* | 8/2015 | Zhang | ..................... | G06F 21/36 |
| 2009/0133120 A1* | 5/2009 | Cannizzaro | ............. | G06F 21/46 726/18 |
| 2014/0366127 A1* | 12/2014 | DeLuca | .................. | G06F 21/36 726/19 |

FOREIGN PATENT DOCUMENTS

| | | |
|---|---|---|
| JP | 2008181440 A | 8/2008 |
| KR | 1020120134484 A | 12/2012 |

OTHER PUBLICATIONS

Search Report under Section 17(5) dated May 21, 2014, Application No. GB1322265.8, 3 pages.

(Continued)

*Primary Examiner* — Shin-Hon Chen
(74) *Attorney, Agent, or Firm* — Stephen R. Tkacs; Stephen J. Walder, Jr.; Lisa J. Ulrich

(57) ABSTRACT

A mechanism is provided for determining and verifying a passcode is disclosed. The mechanism defines a passcode by a set of rules, each representing the position of a target key relative to a reference key on a given keyboard. The mechanism receives user selection of a passcode subset of the set of passcode pattern rules for representing a passcode comprising a pattern of keys on the keyboard. The mechanism stores the passcode subset of rules for subsequent verification against a user input passcode for controlling access to a resource.

15 Claims, 5 Drawing Sheets

(56) References Cited

OTHER PUBLICATIONS

"A Method for Strong Authentication Using Keyboard Patterns to Protect Against Dictionary Attacks", IPCOM000222354D, Sep. 26, 2012, 5 pages.
"Methods for Disguising Password Keystrokes", IPCOM000144164D, Dec. 20, 2006, 3 pages.
"Remember Secure Passwords: Create a Password Pattern", http://ha17.com/768-remember-secure-passwords-create-a-password-pattern/, accessed via the Internet, Apr. 25, 2009, 4 pages.

* cited by examiner

PASSCODE DETERMINATION OR VERIFICATION

BACKGROUND

The present invention relates to a system for determining or verifying a passcode.

Access control systems are provided for controlling access to various types of tangible asset or resource such as physical spaces, plant, facilities or objects or to intangible assets or resources such as data or software. Access control systems commonly require the input of a predetermined passcode in order to provide access to the relevant asset or resource. If an input passcode matches a predetermined passcode then access to the relevant asset or resource is enabled. Passcodes may be input via a keyboard or other suitable input device by way of a pattern of keys or other input device elements.

One problem with relatively simple pattern-based passcodes is that they are easily observed and thus compromised by an unauthorized user. Conversely more complex pattern-based passcodes are often difficult for a user to remember.

SUMMARY

In one illustrative embodiment, an apparatus is provided for determining a passcode for controlling access to a resource. The apparatus comprises a data input for determining a set of passcode pattern rules each defining a target key on a keyboard; a processor for enabling the selecting a passcode subset of the set of passcode pattern rules for representing a passcode comprising a pattern of keys on the keyboard; and memory access for storing the passcode subset of rules for subsequent verification against a user input passcode for controlling access to a resource.

In another illustrative embodiment, a method is provided for determining a passcode for controlling access to a resource. The method comprises determining a set of passcode pattern rules each defining a target key on a keyboard; selecting a passcode subset of the set of passcode pattern rules for representing a passcode comprising a pattern of keys on the keyboard; and storing the passcode subset of rules for subsequent verification against a user input passcode for controlling access to a resource.

In a further illustrative embodiment, a computer program product is provided for determining a passcode for controlling access to a resource. The computer program product comprises a computer-readable storage medium having computer-readable program code embodied therewith, the computer-readable program code configured to determine a set of passcode pattern rules each defining a target key on a keyboard; select a passcode subset of the set of passcode pattern rules for representing a passcode comprising a pattern of keys on the keyboard; and store the passcode subset of rules for subsequent verification against a user input passcode for controlling access to a resource.

BRIEF DESCRIPTION OF THE DRAWINGS

Preferred embodiments of the invention will now be described, by way of example only, with reference to the following drawings in which.

DETAILED DESCRIPTION

Embodiments of the invention provide a password system, which defends against key loggers by enabling the password to be started each time from different keys of a given keyboard. Embodiments of the invention provide a password system in which the passwords may be easier for a user to memorize and recall as the passwords can be defined with significant physical keyboard pattern content.

One or more of the passcode pattern rules may define the position of the respective target key on the keyboard relative to a respective reference key on the keyboard. The passcode subset of rules may be ordered, the reference key for the first rule comprises a start key and the reference key for each subsequent rule in order comprises the target key of the previous rule. The start key may be user selected. The start key may be selected for the user from a predetermined set of start keys for the passcode. The set of start keys may comprise viable start keys from which the passcode pattern can be input on a given keyboard. One or more of the passcode subset of rules may be selected in response to respective user input keyboard characters. The passcode subset of rules may be unordered and the reference key for one or more rules comprises the start key.

The apparatus may be operable to: receive a first set of characters input via a keyboard, identify the keyboard layout; apply the passcode subset of rules to the identified keyboard layout to generate a second set of characters; and if the first set of characters matches the second set of characters then enable access to the resource.

The apparatus may be operable to: receive a set of input keystrokes from a keyboard; identify the keyboard layout; determine the position of each input keystroke for the keyboard layout relative to the respective reference key; compare the determined relative positions of each input keystroke against the passcode subset of rules: and if the determined relative positions of each input keystroke correlate with the passcode subset of rules then enable access to the resource.

Figure 1:
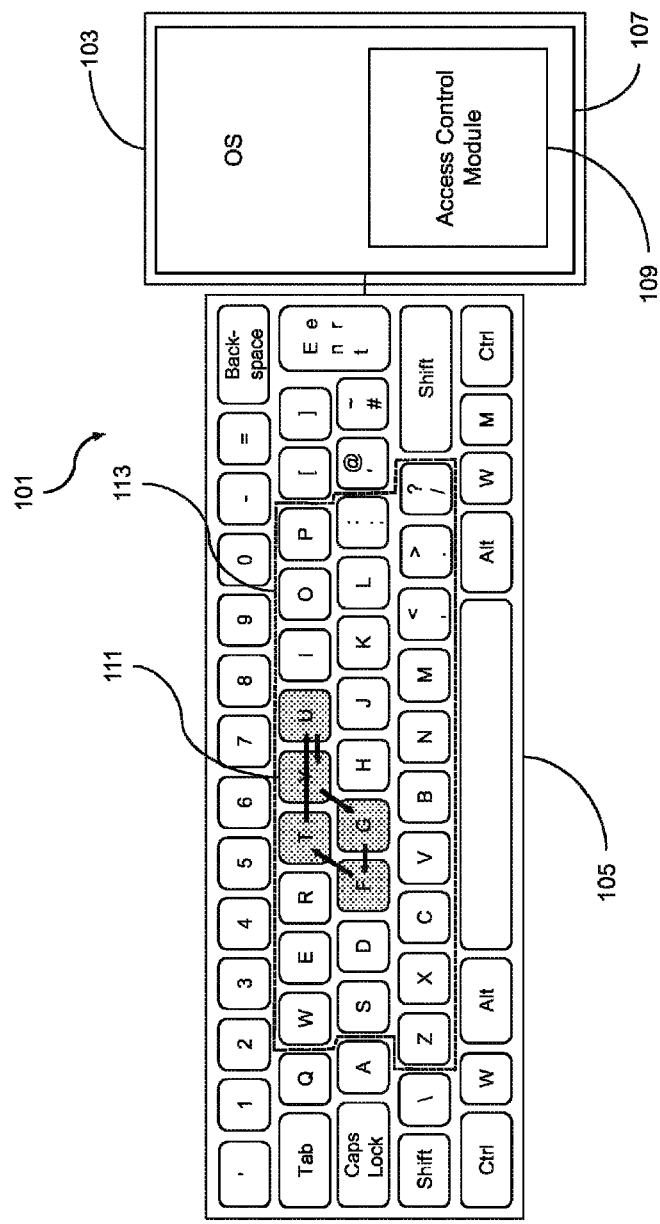
FIG. 1 is a schematic representation of a computer system running an operating system comprising access control logic in accordance with an illustrative embodiment.

With reference to FIG. 1, a computer system 101 comprises a computer 103 with a connected keyboard 105. In the illustrative embodiment, the keyboard 105 is an International Standards Organization (ISO) English layout keyboard. The computer 103 is running an operating system (OS) 107, which comprises access control logic in the form of an access control module 109. The access control module 109 is arranged for use by the OS 107 to control access to the resources of the OS 107 such as the application programs running on the operating system 107 and data stored on the computer 103. The access control module 109 is arranged to provide access control based on the pattern of a user's input on the keyboard 105. In other words, in the present embodiment, the passcode comprises a selected physical pattern of keystrokes on the keyboard 105 which if verified by the access control module 109 enables access to the computer 103.

Figure 2:
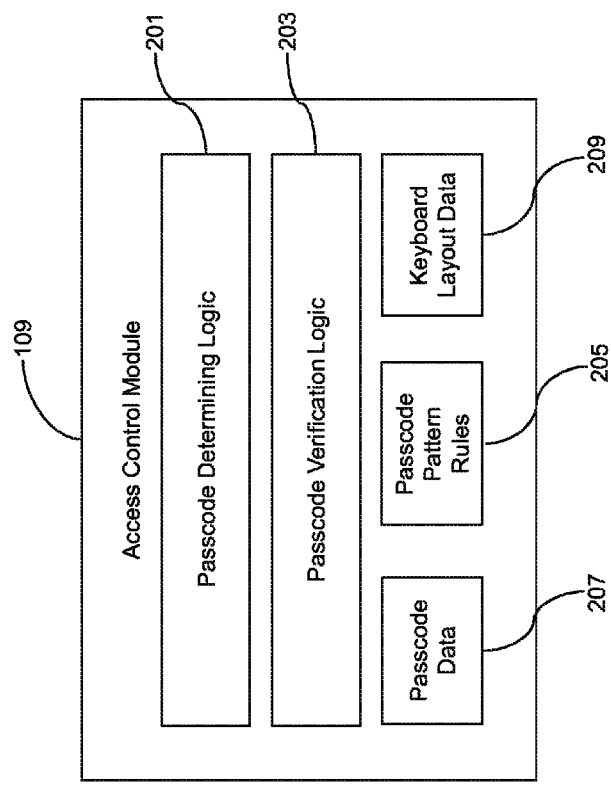
FIG. 2 is a schematic representation of an access control logic comprising passcode determining logic and passcode verification logic in accordance with an illustrative embodiment.

With reference to FIG. 2, the access control module 109 comprises passcode determining logic 201, passcode verification logic 203, passcode pattern rules 205, passcode data 207 and keyboard layout data 209. In the present embodiment, the keyboard layout data 209 comprises a matrix representing each of the valid character input keys for a given keyboard and the relative spatial relationship between each of the keys. The passcode pattern rules 205 comprise a set of rules each defining a respective target key on the keyboard 105. In the present embodiment, the rules 205 define a target key by a number of different methods. One or more of the rules 205 define a respective target key by its position on the keyboard relative to a respective reference key on the keyboard 105. One or more other of the rules 205 define a respective target key by reference to: the character represented by the key; a particular character of a known sequence such as the alphabet or other defined sequence; or a conversion of a letter in a sequence to the corresponding numeral in a corresponding sequence.

Any of the above rules 205 may further qualify the target key by whether the key should be shifted. In the present embodiment, since the rows of keys of the keyboard 105 are offset, the rules referencing between rows refer to above/below left/right to avoid ambiguity. In the present embodiment, a set of eleven rules 205 defining respective target keys are defined as follows:

Nth key above right reference key;
Nth key above left reference key;
Nth key below right reference key;
Nth key below left reference key;
Nth key right of reference key;
Nth key left of reference key;
Repeat reference key;
Specific key;
Nth character in alphabet, n=6;
Nth character before/after reference key in sequence; and
Letter to Roman numeral conversion.

In the present embodiment, any of the above rules may be modified by the addition of the shift key which, depending on the given key, will produce an alternative or uppercase character. In one example embodiment, each passcode comprises an eight-character pattern defined with reference to a subset of the passcode pattern rules 205. This subset is referred to herein as the passcode subset of the set of passcode pattern rules 205.

In the present embodiment, the passcode determining logic 201 is arranged to present the set of passcode pattern rules 205 to a user to enable the user to select the passcode subset that defines the user's desired pattern on the keyboard 105. In the present embodiment, the passcode subset is an ordered set, that is, the rules are applied in turn from a notional start key. As such, no rule is required to define the start key or first character of the passcode. In other words, any reference key for the first passcode rule in the passcode subset is not defined. For each subsequent rule in the passcode subset, if a reference key is required, this reference key is the target key of the previous rule in the sequence. Once the user has selected the passcode subset, this sequence of rules is stored as a first part of the passcode data 207.

In the present embodiment, the passcode determining logic 201 is further arranged to determine all of the valid start keys 113 for a newly input passcode subset. For example, some start keys may be invalid because one or more of the subsequent keys defined by the passcode subset may fall outside of the physical extent of the keyboard 105. In other words, for some start keys, the associated passcode pattern may not fit on the relevant section of the keyboard 105. The passcode determining logic 201 is thus arranged to determine the physical extent or envelope of a given passcode pattern for the keyboard 105 and to select a set of valid start keys 113 which constrain that envelope to the keyboard 105. The set of valid start keys 113 is stored as a second part of the passcode data 207.

An example of the capture of a passcode by user selection of a passcode subset from the set of eleven rules 205 described above. In this example, the user selects the following sequence of seven rules, from an interface (not shown) provided by the passcode determining logic 201, so as to provide an eight key passcode pattern:

1st key left of reference key;
shift key & 1st key above right of reference key;
2nd key right of reference key;
shift key & repeat reference key;
1st key left of reference key;
1st key down left of reference key; and
key.

Since the reference key for a given rule is the prior target key the definition of a given pattern the above sequence can be simplified as follows:

1st left > shift & 1st above right > 2nd right > shift & repeat > 1st left > 1st down left > #

Once the user has defined the pattern passcode above, the passcode determining logic 201 then determines the valid start key set 113 for the keyboard 105. The physical extent of the pattern passcode comprises an envelope 111. In the above example, the envelope of the defined pattern passcode comprises a four key square with a fifth key appended to the upper right key and the upper row shifted right. This passcode pattern envelope 111 is shown shaded in FIG. 1 using the "G" key as the start key for the passcode pattern. The passcode determining logic 201 is arranged to determine the set of valid start keys 113 by finding all valid mappings of the envelope 111 onto the matrix provided by the keyboard layout data 209 for the keyboard 105. For the present example, the determined set of valid start keys 113 is as follows:

w e r t y u i o p
s d f g h j k l;
z x c v b n m , . /

The above set of 28 start keys 113 will each result in a different sequence of input keystrokes when the passcode pattern is input to the keyboard 105. For example, starting with the "i" key would result in the following input keystrokes:

/ . : # ~' / #

Starting with the "G" key would result in the following input keystrokes:

g f T u U y g #

Both example sequences of input keystrokes above are valid inputs of the passcode pattern represented by the passcode subset of rules selected in the example further above for the keyboard 105.

The passcode verification logic 203 is arranged to respond to an instruction from the OS 107 to prompt the user to enter a password forming an eight-character passcode pattern. In response, the passcode verification logic 203 provides the user with a start key for the passcode pattern, which is selected at random from the set of valid start keys 113 stored in the passcode data 207. The passcode verification logic 203 then captures the input sequence of eight keystrokes starting with the provided start key. The passcode verification logic 203 applies the stored passcode subset of rules, starting from the same start key, to the stored matrix 209 modeling the layout of the keyboard 105 to provide a sequence of passcode keystrokes. The resulting sequence of passcode keystrokes is used to verify the input sequence of keystrokes. If the passcode and input sequences match then the input passcode pattern is indicated as validated to the OS 107 and access to the relevant resources enabled.

Figure 3:
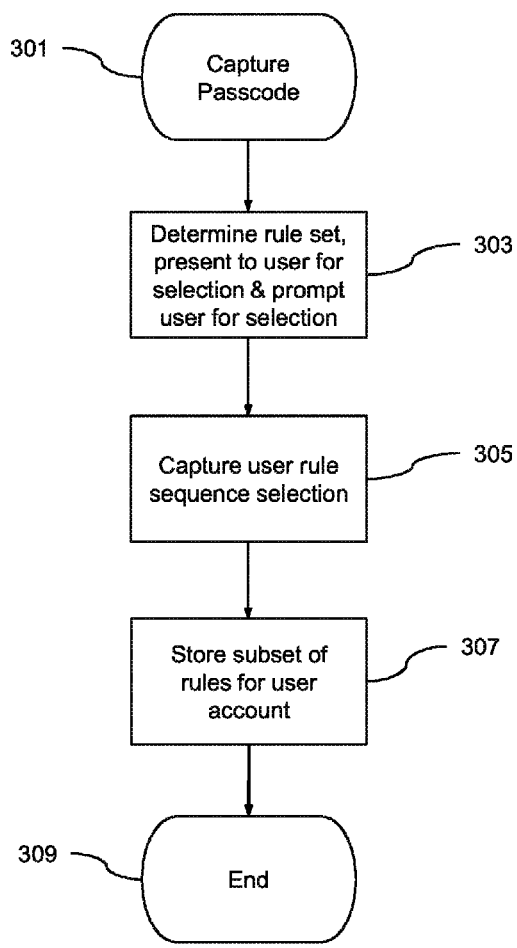
FIG. 3 is a flow chart illustrating the processing performed by passcode determining logic when determining a passcode in accordance with an illustrative embodiment.

The processing performed by the passcode determining logic 201 when capturing a subset of rules will now be described with reference to the flowchart of FIG. 3. Processing is initiated at step 301 in response to a request from the OS 107 and then moves to step 303. At step 303 the available set of passcode pattern rules 205 is determined, presented to the user for selection and the user prompted for selection before processing moves to step 305. At step 305 the user's selected sequence of the passcode pattern rules representing a passcode pattern is captured and processing moves to step 307. At step 307 the selected sequence of the passcode pattern rules is stored for the user's account and processing then moves to step 309 and ends.

Figure 4:
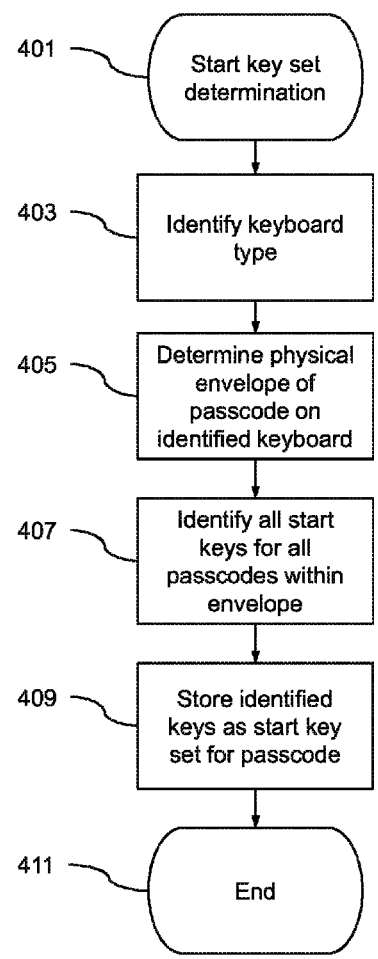
FIG. 4 is a flow chart illustrating the processing performed by passcode determining logic subsequent to determining a passcode in accordance with an illustrative embodiment.

The processing performed by the passcode determining logic 201 when determining the set of valid start keys 113 will now be described with reference to the flowchart of FIG. 4. Processing is initiated at step 401 in response to the storage of a new passcode subset of rules in step 307 in the flowchart of FIG. 3 and processing then moves to step 403. At step 403 the keyboard layout data 209 for the keyboard 105 is selected and processing moves to step 405. At step 405 the physical envelope of the newly stored passcode represented by the new subset of rules is determined and processing moves to step 407. At step 407 the physical envelope of the newly stored passcode is mapped on to the keyboard layout data and all possible start keys identified. Processing then moves to step 409 where the set of valid start keys 113 is stored in the passcode data 207 in association with the passcode subset of rules representing the newly stored passcode. Processing then moves to step 411 and ends.

Figure 5:
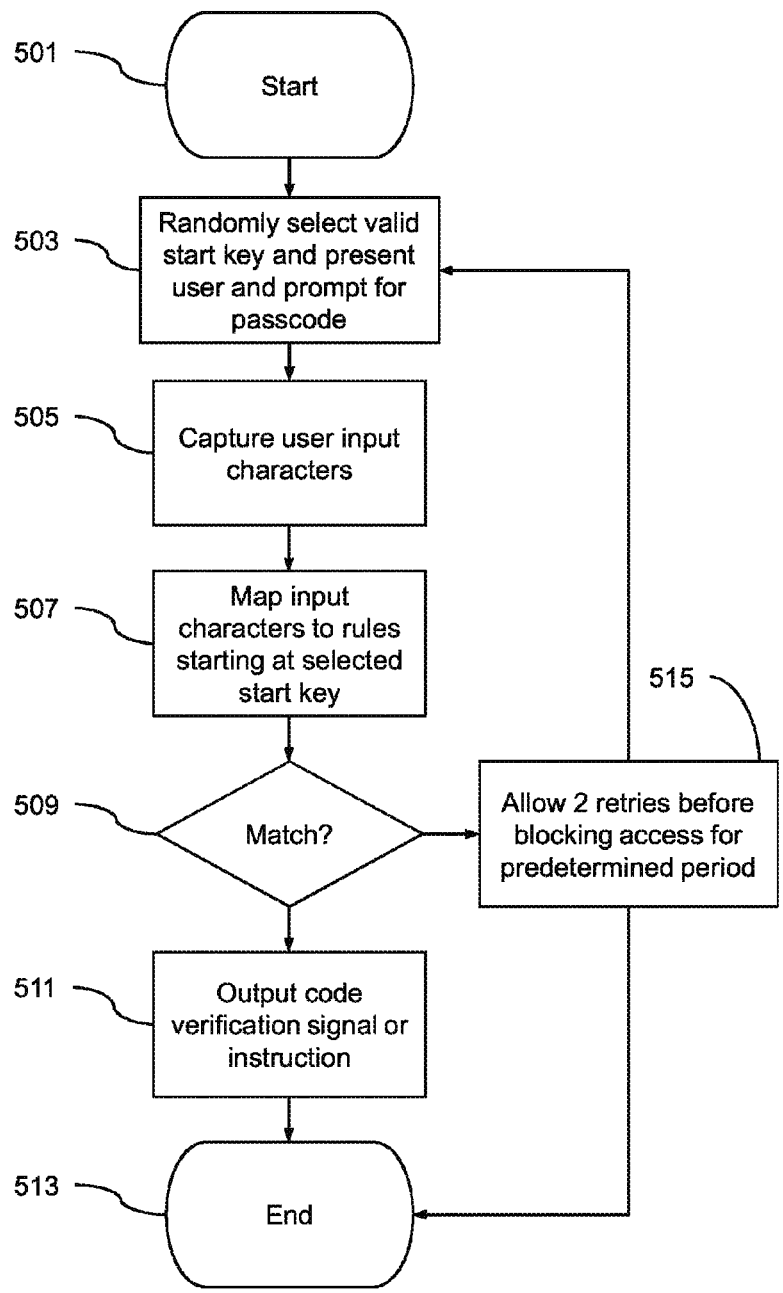
FIG. 5 is a flow chart illustrating the processing performed by passcode verification logic when verifying an input passcode against a stored passcode in accordance with an illustrative embodiment.

The processing performed by the passcode verification logic 203 when validating an input passcode will now be described with reference to the flowchart of FIG. 5. Processing is initiated at step 501 in response to a command from the OS 107 and processing moves to step 503. At step 503 a start key is randomly selected from the set of valid start keys 113 and presented to the user in association with a prompt to the user to input their passcode via the keyboard 105. Processing then moves to step 505 where the user's input from the keyboard 105 is captured and processing moves to step 507. At step 507 the stored passcode subset of rules 207 for the user is applied to the keyboard layout data 209 starting at the selected start key and the corresponding passcode generated. Then at step 509, if the user's input passcode from the keyboard 105 captured in step 505 matches the passcode generated in step 507 then processing moves to step 511. At step 511 a password verification notification is passed to the OS 107. Processing then moves to step 513 and ends. If at step 509 there is no match between the user's input passcode and the generated passcode then processing returns to step 503 via step 515 to allow the user a further chance to input their passcode. If the user fails to input a correct passcode three consecutive times then at step 515 further attempts are blocked for a predetermined period and processing moves to step 513 and ends.

In another embodiment, the passcode determining logic is arranged to preselect a subset of the passcode pattern rules in dependence on a new passcode pattern input by a user. In other words, instead of a user selecting a set of rules to represent a desired passcode pattern, the user inputs the desired passcode pattern and the passcode determining logic selects a subset of rules that result in the user-input passcode pattern for the given keyboard. Where two or more rules could be used to represent a given key press the passcode determining logic is arranged to either select one of the rules automatically in accordance with a predetermined procedure or provide the choice to the user for user selection.

In a further embodiment, the passcode verification logic is arranged such that no start key is required, that is, the user is permitted to input their passcode pattern starting with any user-selected key. The judgment of fitting a given passcode pattern on a given keyboard is devolved from the access control module to the user. If the first key is, in effect, an invalid start key as described above, then this will result in the relevant passcode pattern not fitting within the relevant keys of the given keyboard and result in an incomplete or otherwise invalid input passcode pattern.

In another embodiment, the order of characters in a given passcode pattern is not relevant to the verification procedure. In other words, each passcode pattern is treated as an unordered set of characters. Each character of the passcode pattern is determined with respect to the start key. The passcode pattern can be input in any order and with respect to a user or system selected start key. The passcode verification logic is arranged to disregard character order when verifying a given input passcode and to check that the input set of characters has the same members as the set of characters generated from the relevant passcode subset of rules.

In another embodiment, the set of passcode pattern rules comprises only rules defining the relative position of keys on a keyboard. In other words, rules for particular characters or keys, nth character of a known sequence (alphabet), nth character before/after a given character in a sequence, letter/numeral conversion are omitted.

As will be understood by those skilled in the art, the set of passcode pattern rules is not limited to those specifically described herein but any rule suitable for defining a key on a keyboard may be included as a passcode pattern rule.

In a further embodiment, all possible character strings for a given subset of rules and keyboard are pre-calculated.

In another embodiment, the passcode verification logic is arranged to receive a set of input keystrokes from a keyboard having a given keyboard layout and then to determine the position of each input keystroke for the keyboard layout relative to the respective reference key. The determined relative positions of each input keystroke is then compared against the passcode subset of rules and if the determined relative positions of each input keystroke correlate with the passcode subset of rules then the input passcode is verified and access to the resource enabled.

In another embodiment, a valid start key is calculated on the fly in response to each passcode input request from the OS for a given user.

In a further embodiment, the passcode verification logic is arranged to verify an input passcode against a plurality of keyboard types or layouts to identify a match. The passcode verification logic may be provided with a history or library of likely keyboard layouts.

In another embodiment, the rules for generating the pattern are numbered and the chain of rules followed to produce a given passcode pattern are mapped to a numeric string. This string is then hashed before storing as a record of the passcode subset. This mechanism provides protection against compromises of the password data.

Embodiments of the invention provide a password system, which defends against key loggers by enabling the password to be started each time from different keys of a given keyboard. The variation of the start key may be devolved from the user, that is, determined by the system. Embodiments of the invention provide a password system in which the passwords may be easier for a user to memorize and recall as the passwords can be defined with significant physical keyboard pattern content.

As will be understood by those skilled in the art, while embodiments of the invention are described herein for providing passcode determination or verification in an operating system, embodiments of the invention may be applied in any suitable software system. For example, embodiments may provide passcode determination or verification in application programs, administrative consoles, web pages or any other system where passcodes are used.

As will be understood by those skilled in the art, any suitable mechanism or system for storing an representing a given keyboard layout may be used which enables the determination of the set of valid start keys or the generation of passcodes for verification against user input passcodes.

As will be understood by those skilled in the art, embodiments may make use of any suitable input device including physical or virtual input devices such as soft-keyboards or keypads commonly used in conjunction with touchscreen interfaces.

As will be understood by those skilled in the art, while the system is described above in relation to a single computer, the functions of the system may divided into a client and server architecture. For example, the passcode data, passcode pattern rules and keyboard layouts may be stored under the control of a server application while the passcode capture is performed by a client application. As will be understood by those skilled in the art embodiments of the invention may be employed in any suitable software or hardware architecture where password access is required.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

The invention claimed is:

1. An apparatus for determining a passcode for controlling access to a resource, the apparatus comprising:
    a hardware processor; and
    a memory coupled to the processor, wherein the memory comprises instructions which, when executed by the processor, cause the processor to:
    determine, by an access control module executing within the data processing system, a set of passcode pattern rules each defining a target key on a keyboard, wherein the set of passcode pattern rules are numbered, and wherein one or more of the passcode pattern rules defines a position of a respective target key on the keyboard relative to a respective reference key on the keyboard;
    receive, by passcode determining logic within the access control module, user selection of a passcode subset of the set of passcode pattern rules for representing a passcode comprising a pattern of keys on the keyboard, wherein the passcode subset of rules is ordered, the reference key for a first rule of the passcode subset of rules comprises a start key, and a reference key for each subsequent rule in order comprises a target key of a previous rule;
    map, by the access control module, the selected passcode subset of passcode pattern rules followed to produce the pattern of keys to a numeric string;
    hash, by the access control module, the numeric string to form a hash value; and
    store the hash value of the passcode subset of rules for subsequent verification against a user input passcode by passcode verification logic within the access control module for controlling access to a resource.

2. The apparatus according to claim 1, wherein the start key is user selected.

3. The apparatus according to claim 1, wherein the start key is selected for the user from a predetermined set of start keys for the passcode.

4. The apparatus according to claim 3, wherein the set of start keys comprises viable start keys from which the passcode pattern can be input on a given keyboard.

5. The apparatus according to claim 1, wherein one or more of the passcode subset of rules are selected in response to respective user input keyboard characters.

6. The apparatus according to claim 1, wherein the instructions further cause the processor to:
    receive a first set of characters input via a keyboard;
    identify the keyboard layout;
    apply the passcode subset of rules to the identified keyboard layout to generate a second set of characters; and
    responsive to determining the first set of characters matches the second set of characters, enable access to the resource.

7. The apparatus according to claim 1, wherein the instructions further cause the processor to:
    receive a set of input keystrokes from a keyboard;
    identify the keyboard layout;
    determine a position of each input keystroke for the keyboard layout relative to a respective reference key;
    compare the determined relative positions of each input keystroke against the passcode subset of rules; and
    responsive to determining the determined relative positions of the set of input keystrokes correlate with the passcode subset of rules, enable access to the resource.

8. A method for determining a passcode for controlling access to a resource, the method comprising:
- determining, by an access control module executing on a hardware processor of a data processing system, a set of passcode pattern rules defining a target key on a keyboard, wherein the set of passcode pattern rules are numbered, and wherein one or more of the passcode pattern rules defines a position of a respective target key on the keyboard relative to a respective reference key on the keyboard;
- receiving, by passcode determining logic within the access control module, user selection of a passcode subset of the set of passcode pattern rules for representing a passcode comprising a pattern of keys on the keyboard, wherein the passcode subset of rules is ordered, the reference key for a first rule of the passcode subset of rules comprises a start key, and a reference key for each subsequent rule in order comprises a target key of a previous rule;
- mapping, by the access control module, the selected passcode subset of passcode pattern rules followed to produce the pattern of keys to a numeric string;
- hashing, by the access control module, the numeric string to form a hash value; and
- storing the hash value of the passcode subset of rules for subsequent verification against a user input passcode by passcode verification logic within the access control module for controlling access to a resource.

9. The method according to claim 8, wherein the start key is user selected.

10. The method according to claim 8, wherein the start key is selected for the user from a predetermined set of start keys for the passcode.

11. The method according to claim 10, wherein the set of start keys comprises viable start keys from which the passcode pattern can be input on a given keyboard.

12. The method according to claim 8, wherein one or more of the passcode subset of rules are selected in response to respective user input keyboard characters.

13. The method according to claim 8, further comprising:
- receiving a first set of characters input via a keyboard;
- identifying the keyboard layout;
- applying the passcode subset of rules to the identified keyboard layout to gen a second set of characters; and
- responsive to determining the first f characters matches the second set of characters, enabling access to the resource.

14. The method according to claim 8, further comprising:
- receiving a sequence of input keystrokes from a keyboard;
- identifying the keyboard layout;
- determining the position of each input keystroke for the keyboard layout relative to the respective reference key;
- comparing the determined relative positions of each input keystroke against the passcode subset of rules; and
- responsive to determining the determined relative positions of the set of input keystrokes correlate with the passcode subset of rules, enabling access to the resource.

15. A computer program product for determining a passcode for controlling access to a resource, the computer program product comprising a non-transitory computer-readable storage medium having computer-readable program code embodied therewith, wherein the computer-readable program code, when executed on a hardware processor of a computing device, causes the computing device to:
- determine a set of passcode pattern rules each defining a target key on a keyboard, wherein the set of passcode pattern rules are numbered, and wherein one or more of the passcode pattern rules defines a position of a respective target key on the keyboard relative to a respective reference key on the keyboard;
- receive, by passcode determining logic within the access control module, user selection of a passcode subset of the set of passcode pattern rules for representing a passcode comprising a pattern of keys on the keyboard, wherein the passcode subset of rules is ordered, the reference key for a first rule of the passcode subset of rules comprises a start key, and a reference key for each subsequent rule in order comprises a target key of a previous rule;
- map, by the access control module, the selected passcode subset of passcode pattern rules followed to produce the pattern of keys to a numeric string;
- hash, by the access control module, the numeric string to form a hash value; and
- store the hash value of the passcode subset of rules for subsequent verification against a user input passcode by passcode verification logic within the access control module for controlling access to a resource.

* * * * *